United States Patent [19]
Melton et al.

[11] Patent Number: 5,116,593
[45] Date of Patent: May 26, 1992

[54] METHOD OF PRODUCING A HYPOHALOGENATED ACID

[75] Inventors: James K. Melton; Garland E. Hilliard; John H. Shaffer, all of Cleveland, Tenn.

[73] Assignee: Olin Corporation, Cheshire, Conn.

[21] Appl. No.: 525,285

[22] Filed: May 17, 1990

Related U.S. Application Data

[63] Continuation-in-part of Ser. No. 254,634, Oct. 7, 1988, abandoned, and a continuation-in-part of Ser. No. 264,667, Oct. 31, 1988.

[51] Int. Cl.$^5$ .................... C01B 11/00; C01B 11/04
[52] U.S. Cl. .................... 423/473; 423/472
[58] Field of Search .................... 423/473, 472

Primary Examiner—John Niebling
Assistant Examiner—Brian M. Bolam
Attorney, Agent, or Firm—Ralph D'Alessandroi

[57] ABSTRACT

A method of using an elongated, generally vertically extending cocurrent reactor vessel for the production of hypochlorous acid by the mixing and reaction of a liquid alkali metal hydroxide and a gaseous halogen is provided wherein an atomizer is mounted near the top of the reactor vessel to atomize the liquid alkali metal hydroxide into droplets in the vessel. The vessel has a spraying and reaction zone immediately beneath the atomizer and a drying zone beneath the spraying and reaction zone to produce a gaseous hypochlorous acid and a substantially dry solid salt by-product.

18 Claims, 2 Drawing Sheets

METHOD OF PRODUCING A HYPOHALOGENATED ACID

BACKGROUND OF THE INVENTION

This is a continuation-in-part application of application Ser. No. 254,634, filed Oct. 7, 1988, now abandoned, and application Ser. No. 264,667, filed Oct. 31, 1988.

This invention relates generally to a reactor vessel and more specifically to a reactor vessel for the production of and the method of producing therein hypohalogenated acid by the mixing and reaction therein of an alkali metal hydroxide and a gaseous halogen. A preferred product acid is hypochlorous acid.

Hypochlorous acid is used extensively in the preparation of chlorohydrin and chloramines. Chloroisocyanurates are typical examples. Dilute hypochlorous acid and large quantities of halogen have been used recently to produce hypohalites, such as sodium hypochlorite. Hypochlorous acid has been produced by several processes or techniques.

One technique employs the process in which chlorine, steam and air are bubbled through an aqueous solution of an alkaline earth metal hypochlorite, such as calcium hypochlorite, to remove the resulting hypochlorous acid in vapor form. The hypochlorous acid is then condensed and stored for use. This process, however, produces a large volume of undesirable by-product, calcium chloride.

Another process uses a low concentration of aqueous caustic solution to scrub chlorine gas. However, the solution has an available chlorine content of about only 5% and, because of the chloride ion content, the hypochlorous acid that is formed quickly decomposes, usually to chloric acid.

Another related process prepares a solid mixture of alkali metal hypochlorite and alkali metal chloride by reacting chlorine gas with a spray of alkali metal hydroxide, while drying with a gas the reactants and product. Some cooling of the reacting chemicals and the drying gas may be done. The primary products of this process have very limited utility.

A more recent process, which produces hypochlorous acid vapor, sprays aqueous alkali metal hydroxide in droplet form or solid alkali metal hydroxide particles into gaseous chlorine. This approach attempts to utilize droplet sizes to attain the maximum surface to volume ratio possible. Droplets having an average diameter of less than about 1000 microns are employed.

These previous processes, and the apparatus employed to produce these processes, have suffered from not achieving substantially complete reactions between the chlorine and the alkali metal hydroxide. A critical factor in determining the complete reaction is the droplet size of the alkali metal hydroxide. It is also desirable that any hypochlorous acid produced and any water present be readily vaporizable. The salt particles produced as by-products in any process should be dry to facilitate handling and to reduce the amount of moisture in the salt that exists as free water and which fuels the decomposition of the product hypochlorous acid to chlorate and chlorine. The most detrimental decomposition reaction occurs almost instantaneously between a pH of 4 and 7.5 and is driven by the chloride ion concentration that is present when the free water dissolves the salt, forming chloride ions in solution that react with and decompose the hypochlorous acid. In the presence of this free water, the product hypochlorous acid decomposition reaction occurs as follows:

$$5HOCl \rightarrow HClO_3 + 2Cl_2 + 2H_2O.$$

Therefore, it is advantageous to dry the by-product salt particles as quickly as possible. The dryness of the salt is a direct function of the size of the alkali metal hydroxide particles sprayed and the heat introduced into the reactor.

The by-product salt particles should be sized so that they readily separate from the gaseous product mixture of hypochlorous acid. Prior processes have utilized oversized alkali metal hydroxide droplets that result in the undesired reaction of hypochlorous acid and the oversized by-product salt particles to produce significant alkali metal chlorates. The presence of such alkali metal chlorates reflects reduced yields of the desired hypochlorous acid, while increasing the raw material and operating costs. The resulting oversized by-product salt particles also retain excessive moisture so that caking results and the caked mass adheres to the reactor surfaces.

These problems are solved by the present invention via the method of employing a reactor vessel and the vessel s particular design wherein a reactor vessel for the production of hypochlorous acid is provided in which the mixing and reaction of an alkali metal hydroxide and a gaseous halogen occurs to produce a substantially dry solid salt by-product and the gaseous hypohalogenated acid.

SUMMARY OF THE INVENTION

It is an object of the present invention to provide a process and a reactor vessel within which a liquid phase controlled reaction can occur to produce a hypohalogenated acid.

It is another object of the present invention to provide a reactor vessel in which both a liquid-gas reaction and drying occur to produce a gaseous product and a by-product that is substantially dry.

It is a feature of the present invention that an atomizer is employed to produce small droplets of an alkali metal hydroxide to ensure that the undesirable secondary reactions are minimized and that proper drying of the desired particles occurs.

It is another feature of the present invention that the reactor vessel permits the rapidly sequential events of absorption of gaseous halogen into the atomized particles of alkali metal hydroxide and water evaporation to occur.

It is still another feature of the present invention that the atomizer is located near the top of the reactor vessel.

It is yet another feature of the present invention that a heated halogen gas mixture is fed into the top of the reactor vessel.

It is a further feature of the present invention that the solid by-product alkali metal salt is dried as quickly as possible in the reactor to produce a substantially dry solid by-product.

It is still a further feature of the present invention that the moisture content of the solid by-product is determined by the length of the reactor vessel in proportion to its diameter, in addition to the droplet size of the alkali metal hydroxide sprayed and the amount of heat introduced into the reactor vessel.

It is yet a further feature of the present invention that the solid by-product with a substantially reduced moisture content contains less than about 5% by weight of water, preferably less than about 2% by weight of water and more preferably less than about 1% by weight of water.

It is an advantage of the present invention that the use of oversized alkali metal hydroxide droplets is avoided and that undesirable secondary reactions are minimized.

It is another advantage of the present invention that the manufacturing costs of the reactor and the production costs of the hypochlorous acid are substantially reduced.

It is still another advantage of the present invention that the process to produce a hypohalogenated acid is substantially halide free.

These and other objects, features and advantages are provided in an elongated and generally vertically positioned reactor vessel and the process of using that reactor vessel for the production of hypochlorous acid from the mixing and reaction of an alkali metal hydroxide and gaseous chlorine by the use of an atomizer for atomizing the alkali metal hydroxide. The atomizer is mounted within the reactor vessel above the spraying and reaction zone and the drying zone. The solid by-product alkali metal salt is substantially moisture free to substantially reduce or prevent undesired decomposition reactions of the product hypohalogenated acid.

BRIEF DESCRIPTION OF THE DRAWINGS

The advantages of this invention will become apparent upon consideration of the following detailed disclosure of the invention, especially when it is taken in conjunction with the drawings wherein.

DETAILED DESCRIPTION OF THE PREFERRED EMBODIMENT

Figure 1:
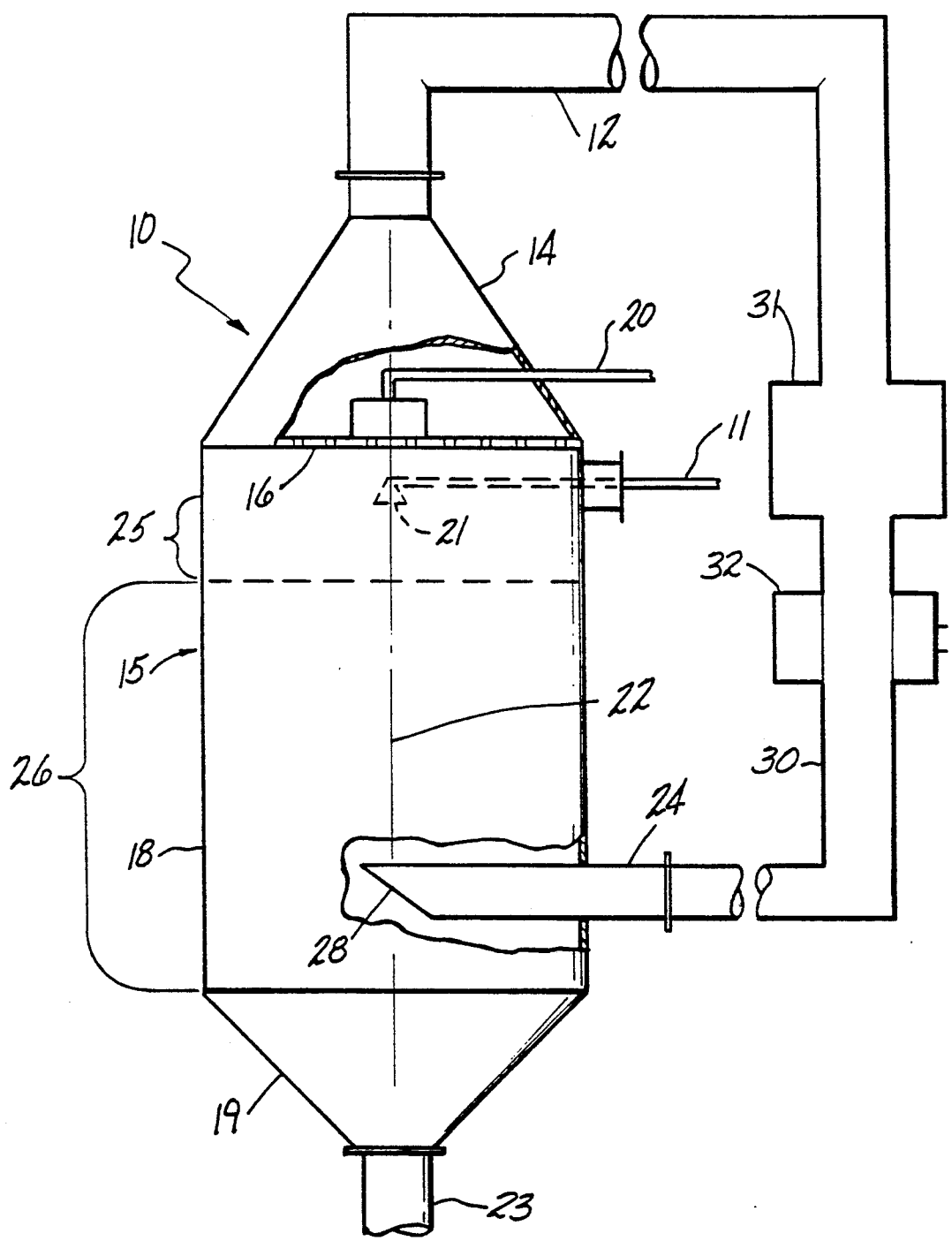
FIG. 1 is a side elevational view of the reactor vessel.

FIG. 1 shows the reactor, indicated generally by the numeral 10, which reacts the liquid alkali metal hydroxide, such as caustic, supplied by feed line 11 with the gaseous halogen, such as chlorine, to produce the solid salt crystals and the gaseous product, such as HOCl. The HOCl is condensed to produce liquid hypochlorous acid which, for example, can be mixed with a lime slurry to produce calcium hypochlorite.

Although the reactor will be discussed in terms of producing hypochlorous acid, it is to be understood that any halogen, including chlorine, bromine, fluorine or iodine could be employed to produce a hypohalogenated acid. Additional such acids include, for example, hypobromous or hypofluorous acid. Similarly, although the instant invention will be discussed primarily in terms of spraying caustic or sodium hydroxide droplets, it is to be understood that any suitable hydroxide could be employed, such as any of the alkali metal hydroxides or alkaline earth metal hydroxides, or mixtures thereof. It is also possible that the method of the instant invention could employ any suitable basic compound, including carbonates, in lieu of the hydroxide.

Gaseous chlorine, along with some chlorine monoxide in the recycle system, is fed into reactor 10 via gas infeed 12 in the top 14. Top 14 is in the shape of an inverted funnel, that can be constructed of a suitable corrosion resistant material, such as titanium; coated titanium; an alloy of nickel, chrome, molybdenum, iron and other materials; tantalum; and lined carbon steel or lined fiberglass reinforced plastic. The lining can be a suitable polyfluoropolymer.

Reactor vessel 15 has a perforated plate 16 at the top between the reactor top 14 and the vessel 15. The plate 16 is also made of a suitable corrosion resistant material, such as polytetrafluoroethylene or one of the above mentioned materials with respect to top 14, and serves to create a straight cocurrent flow path for the chlorine gas flowing down from the top 14. The fresh chlorine gas enters the reactor vessel 15 through feed line 20 at a temperature of about 40° C. Ethylene chlorotrifluoroethylene has also been used as a construction material for reactor vessel 15. Vessel 15, similarly can be made from any suitable corrosion resistant material, such as carbon steel with a liner or coating of a suitable perfluoropolymer, such as that sold under the tradename TEFLON ® PFA.

Reactor vessel 15 has a generally elongated cylindrical central section 18 which tapers to a conically shaped funnel bottom 19 to permit solid alkali metal halide salt, such as NaCl, product to discharge out through a standpipe, not shown, for further processing. Vessel 15 has a caustic feed line 11 that enters through its side and provides the caustic, which is heated to between about 80° to about 110° C. and more preferably between about 95° to about 100° C., to an atomizer nozzle 21. Nozzle 21 is mounted along the center line 22 of the vessel 15 about six (06) inches below the top of vessel 15. Nozzle 21 creates caustic droplets of a desired size between about 50 to 200 microns which are of sufficient size to absorb virtually all of the gaseous chlorine feed while the chlorine and caustic react fast to produce the reaction product mixture of gaseous and solid products as shown in the equation:

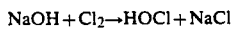

$$NaOH + Cl_2 \rightarrow HOCl + NaCl$$

The reaction occurs at a pH of about 4 to about 6 with a stoichiometric ratio of about 30 to 1 chlorine to caustic.

The gaseous mixture in the reactor vessel 15 includes hypochlorous acid vapor that results from the almost instantaneous vaporization of the liquid phase hypochlorous acid, dichlorine monoxide, unreacted chlorine and water vapor. The gaseous mixture includes a high concentration of the dichlorine monoxide, which is the predominate chloroxy species present and which is present in equilibrium with the hypochlorous acid vapor and the water vapor as expressed by the equation:

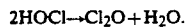

$$2HOCl \rightarrow Cl_2O + H_2O.$$

The gaseous HOCl and water vapor are condensed by a condenser 32 of FIG. 1 between about 0° to about 10° C., after exiting the reactor and the appropriate gas-solid salt by-product separation equipment (not shown), to recover a concentrated HOCl solution. The dichlorine monoxide dissolves in substantially all of the condensed water to significantly add to the concentrated HOCl solution.

Recycled gases, such as chlorine and dichlorine monoxide, are exhausted from the vessel 15 through exhaust duct 24 and are fed back into reactor 10 as a gaseous heated medium via a recirculation loop 30 at about 140° C., after passing through a heat exchanger 31 to achieve the necessary heat, when combined with the heat of reaction to evaporate the hypohalogenated acid, such as hypochlorous acid, and water phase to leave a dry sodium chloride or salt solid by-product. The desired reaction temperature ranges from about 80° to about 100° centigrade. The recycled gases are also used as reactant gases in the production of the hypohalogenated acid.

The recycled gases, for example chlorine and dichlorine monoxide, enter the reactor vessel top 15 and disperse outwardly in the inverted funnel top 14 and pass through the flow directing means or perforated plate 16 to enter the reactor vessel 15 in a generally vertical flow orientation. Fresh halogen gas, for example chlorine, is fed in through chlorine feed line 20 through the reactor top 14 and is directed down over the nozzle or atomizer 21.

Nozzle 21 may be a single fluid atomizer, a two fluid nozzle or a wheel atomizer dependent upon the viscosity and density of the alkali metal hydroxide being atomized and the amount of pressure to which the liquid is subjected. The materials of construction of the nozzle must be capable of withstanding the harshness of the environment within the reactor.

Figure 2:
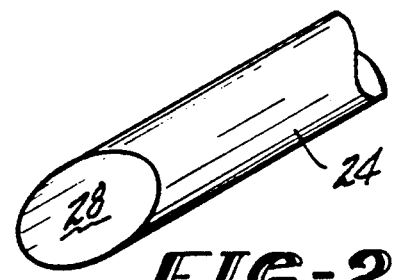
FIG. 2 is a bottom perspective view of the ellipsoid inlet for the exhaust duct.

The vessel 15 has an outlet or exhaust duct 24 at the bottom of the drying zone 26 just above the funnel or conically shaped bottom 19 to remove the product gas, the unreacted halogen gas and some by-product into the recirculation loop 30 as previously described. Outlet or exhaust duct 24 exits through the side of vessel 15 generally horizontally and has an inlet 28 that is undercut such that the top overhangs or overlies and covers the bottom to preclude solid alkali metal chloride by-product, for example sodium chloride, from falling directly into it. The preferred shape of the inlet 28 is an undercut ellipsoid, as seen in FIG. 2. Alternately, and more preferably the product gas, the unreacted halogen gas and the by-product solid salt all exit through the funnel bottom 19 into a common outlet pipe 23 for routing to a common gas-solid salt by-product separation apparatus, such as a baghouse (not shown).

The vessel 15 has its central section 18 preferably cylindrically shaped, but it could also be polygonal, as appropriate. The cylindrical design has a desired diameter and length. The length extends from the top at the perforated plate 16 to the bottom of the drying zone 26, just above the funnel bottom 19, or alternately the length can be defined as the distance of the straight side portion of the cylinder or reactor vessel 15. The dimensions of the length and the diameter can be selected so that the length to diameter ratio, 1/d, can range from about 1 to 1 to about 5 to 1. A preferred ratio is about 3.7 to 1, with the more preferred ratio being about 2.3 to 1. The larger the diameter of the reactor vessel 15 the slower is the rate of fall of the solid salt by-product particles, utilizing a fixed gas flow rate.

The length of the reactor vessel 15 in proportion to its diameter helps determine the moisture content of the solid by-product salt particles, in combination with the size of the alkali metal hydroxide droplets sprayed into the vessel 15 from atomizer nozzle 21 and the amount of heat introduced into the vessel 15 to accomplish drying. Since the alkali metal hydroxide droplets react almost instantaneously with the halogen gas to form the solid salt by-product particles, the size of the reactor is determined by the time required to dry the resultant salt by-product particles. The constant rate drying time is negligible since a crust forms on the surface of the salt by-product particles almost instantaneously.

Therefore, the reactor vessel 15 dimensions are determined assuming only a falling rate drying time by using the following derivation of the equation presented by W. E. Ranz and W. R. Marshall Jr. as part of graduate study at the University of Wisconsin presented in the March and April 1952 editions of Chemical Engineering Progress:

$$\frac{dW'}{dt} = \frac{-12 K_d \Delta T}{\tau D_c^2 \rho_s}$$

In this equation $W'$ represents the moisture content of the solid by-product salt particle, $t$ represents the falling time of the solid by-product salt particle, $K_d$ represents the thermal conductivity of the unreacted recycled chlorine gas used for drying, $\Delta T$ represents the temperature difference between the solid by-product salt particle and recycled gases, $\tau$ represents the latent heat of vaporization of water, $\rho_s$ represents the density of the dry solid salt by-product, and $D_c$ represents the solid by-product salt product diameter at the point of evaporation.

The equation is solved for the drying time, knowing the temperature of the gas and of the hydroxide as it comes into the reactor, the volume of gas that must pass through the reactor to dry the material in the reactor, as calculated from the material balance, and the heat that must be supplied by the recycled gas to evaporate the quantity of moisture in the by-product salt particles in the reactor. Using these factors the length and diameter of the reactor are sized to be able to handle the required flow rate and the time required for drying.

In operation the halogen gas, for example chlorine, is fed into the reactor 10 through feed line 20 and is directed generally vertically downward over nozzle 21. Recycled gases are fed in from the recirculation system via gas infeed 12 into the reactor top 14 and are directionalized by perforated plate 16 down into reactor vessel 15. Vessel 15 has an elongate cylindrical section 18 which has a spraying and drying zone 25 adjacent the top surrounding nozzle 21 and a drying zone 26 therebelow.

The reacted gases exit the reactor 10 through outlet or exhaust duct 24 for processing and recirculation, as appropriate. The solid by-product alkali metal halide, such as sodium chloride, exits the vessel 15 through the conically shaped funnel bottom 19 for processing. Bottom 19 is connected by conventional flanging to outlet pipe 23 and then to other connecting pipes (not shown).

The solid by-product alkali metal halide is dried as it passes down through the drying zone 26. When employed, the overhanging top portion of exhaust duct 24 prevents substantial quantities of the solid by-product from being drawn out through the undercut ellipsoid inlet 28 with the product HOCl gas and the recycle gases. The preferred water content of the solid by-product alkali metal halide is less than 5% by weight, preferably less than 2% and more preferably less than 1%. Low moisture or water contents such as these facilitate separating the solid by-product salt and product gas streams, while limiting the decomposition of the product hypohalogenated acid.

The following example is presented to define and illustrate the advantages of the present invention more fully without any intention of limiting the invention thereby. All percentages are by weight, unless otherwise specified.

EXAMPLE 1

A plurality of NaCl salt samples were obtained from the reactor of FIG. 1 utilizing isokinetic sampling. The reactor vessel was about 11 feet seven inches long with a vessel diameter of about 3 feet two inches. Each sample was analyzed for water content by gravimetric measurement. The salt sample was first weighed as taken from the reactor and then was dried for about 5 minutes, such as by infrared heating. The dried sample was then weighed and the weight differential is the water content.

A corresponding product HOCl sample was obtained from the condenser and was analyzed for percentage concentration. This is significant when determining the yield of HOCl from the process since the concentration is directly proportional to yield. The yield is defined as the percentage conversion of caustic to HOCl on a molar basis. An HOCl concentration of 49% is believed to translate to a yield of about 85%, while a concentration of about 40% is believed to translate to a yield of about 65%.

The caustic atomization pressure of the atomizer within the reactor for all samples was maintained between about 975 and 1000 psig. The data corresponding to the samples taken is shown below in Table 1. The reactor temperature was increased to obtain a drier NaCl sample, although the most important controlling factor is the atomization size of the caustic droplets, since the drying rate is a function of the square of the size of the by-product salt particle that is formed by the drying of the caustic droplets. As seen from the data in Table 1, there is an inverse relationship between the moisture content of the solid by-product particle and the concentration of the product hypochlorous acid.

TABLE 1

| \multicolumn{4}{c}{HOCl CONCENTRATION VS. NaCl "DRYNESS"} | | | |
|---|---|---|---|
| NACL WT. % H2O | REACTOR TEMP (°C.) | HOCl WT. % | CONDENSER TEMP (°C.) |
| 2.09 | 84 | 45.4 | 6 |
| 2.49 | 95 | 41.9 | 6 |
| 0.95 | 93 | 51.4 | 5 |
| 1.92 | 84 | 46.2 | 5 |
| 1.89 | 94 | 47.1 | 4 |
| 14.07 | 82 | 23.8 | 5 |
| 1.90 | 95 | 45.9 | 2 |
| 1.64 | 99 | 46.1 | 3 |
| 1.65 | 99 | 45.7 | 7 |
| 3.31 | 98 | 42.6 | 3 |
| 3.66 | 98 | 43.3 | 8 |
| 4.10 | 97 | 43.1 | 9 |
| 8.43 | 86 | 38.6 | 9 |
| 21.89 | 93 | 32.7 | 9 |
| 20.03 | 98 | 31.9 | 7 |
| 2.22 | 82 | 44.7 | 4 |

Figure 3:
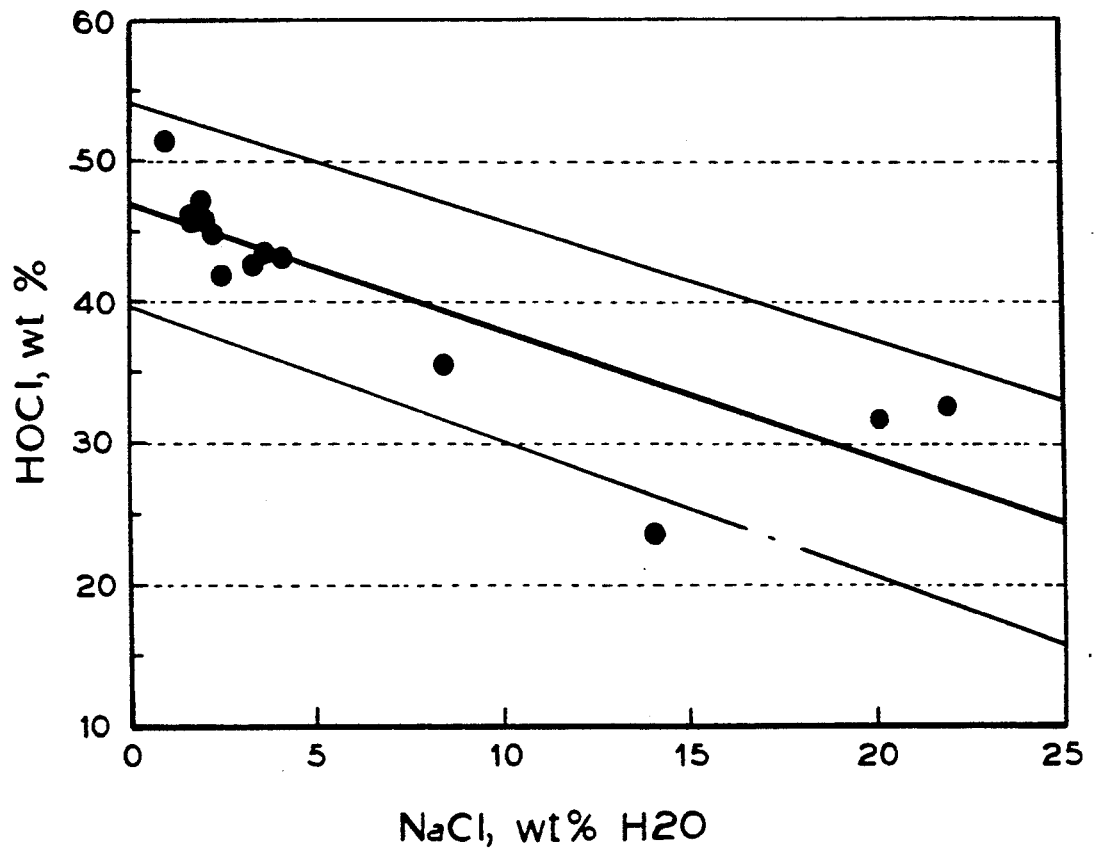
FIG. 3 is a graphical plot of the product yield of hypochlorous acid, measured as a percent by weight, versus the dryness of the solid sodium chloride salt by-product, also measured as a percent by weight.

The graphical plot depicted in FIG. 3 shows the correlation between the concentration of the product hypochlorous acid and the NaCl water content. Generally, the lower the water content of the solid by-product salt, the higher is the concentration of the product HOCl. The data points with the higher percent by weight water analyses were likely the result of caustic droplets being formed from a clogged or blocked spray nozzle. The center line on the plot represents the computed value of the HOCl concentration using the equation $-0.89X + 46.87 = Y$ derived from the statistical analysis linear regression of the data in Table 1, while the two parallel lines above and below represent the statistical upper and lower limits of the HOCl concentration at 95% confidence. One random data point occurred with the NaCl percentage of water content of 14.07% which fell outside the lower limit of the computed HOCl concentration.

While the preferred structure in which the principles of the present invention have been incorporated is shown and described above, it is to be understood that the invention is not to be limited to the particular details thus presented, but, in fact, widely different means may be employed in the practice of the broader aspects of this invention. For example, it is possible to practice the method of the instant invention in either a cocurrent reactor, such as is described herein, or a counter-current reactor such as that disclosed in patent application U.S. Ser. No. 254,559, filed Oct. 7, 1988 and assigned to the assignee of the present invention, which is hereinafter specifically incorporated by reference in pertinent part The scope of the appended claims is intended to encompass all obvious changes in the details, materials, and arrangement of parts which will occur to one of skill in the art upon a reading of the disclosure.

What is claimed is:

1. A method of producing a hypohalogenated acid in a reactor, comprising the steps of:
   (a) spraying atomized droplets of an aqueous hydroxide into a reactor vessel;
   (b) feeding a gaseous halogen into the atomized alkali metal hydroxide spray;
   (c) reacting the gaseous halogen with the atomized droplets of the hydroxide in a heated atmosphere to form a reaction product mixture including hypohalogenated acid, water and a solid halide salt by-product;
   (d) introducing a heated recycled gaseous halogen medium into the reactor vessel to vaporize the hypohalogenated acid and substantially all of the water in the halide salt in a drying zone in the reactor vessel to dry the halide salt to a moisture content of less than about 5 percent by weight; and
   (e) removing the hypohalogenated acid and the halide salt from the reactor vessel.

2. The method according to claim 1 further comprising passing the halide salt through a drying zone within the reactor to dry the halide salt to a moisture content of less than about 2 percent by weight.

3. The method according to claim 1 further comprising passing the halide salt through a drying zone within the reactor to dry the halide salt to a moisture content of less than about 1 percent by weight.

4. The method according to claim 1 further comprising separating the dry halide salt from the vaporized hypohalogenated acid and any unreacted heated halogen gases.

5. The method according to claim 4 further comprising providing the heated gaseous medium by recycling unreacted heated halogen gases into the reactor vessel into the atomized hydroxide spray.

6. The method according to claim 5 further comprising reacting the sprayed droplets of hydroxide with the gaseous halogen at a reaction temperature of about 80° to about 100° Centigrade.

7. The method according to claim 6 further comprising employing an elongated, generally vertical reactor vessel.

8. The method according to claim 7 further comprising directionalizing the spray of atomized hydroxide droplets in a generally downwardly vertical path.

9. The method according to claim 8 further comprising directionalizing the feed of the gaseous halogen in a generally downwardly vertical flow path 10. The method according to claim 9 further comprising feeding the gaseous halogen from above down into the spray of atomized hydroxide droplets.

11. The method according to claim 10 further comprising feeding the recycled unreacted heated halogen gases into the reactor vessel through the top of the reactor vessel.

12. The method according to claim 11 further comprising directionalizing the flow of the recycled unreacted heated halide gases in a generally downwardly vertical flow path above the spray of atomized hydroxide droplets.

13. The method according to claim 12 further comprising using a halogen gas selected from the group consisting of chlorine, fluorine, bromine and iodine.

14. The method according to claim 13 further comprising using a hydroxide selected from the group consisting of alkali metal hydroxides and alkaline earth metal hydroxides or mixtures therof.

15. The method according to claim 14 further comprising using chlorine as the halogen gas.

16. The method according to claim 15 further comprising using sodium hydroxide as the hydroxide.

17. The method according to claim 4 further comprising passing the separated vaporized hypohalogenated acid and unreacted heated halogen gases through a condenser at a temperature of about 0° to about 10° Centigrade to recover a concentrated hypohalogenated acid.

18. The method according to claim 8 further comprising directionalizing the feed of gaseous halogen in a generally upwardly flow direction into the generally downwardly vertical flow path of the spray of atomized hydroxide droplets.

* * * * *